United States Patent [19]

Douma et al.

[11] 4,242,725
[45] Dec. 30, 1980

[54] LIGHT REFLECTOR STRUCTURE

[75] Inventors: William L. Douma, West Paterson; Ward E. Brigham, Rutherford, both of N.J.

[73] Assignee: Sun Chemical Corporation, New York, N.Y.

[21] Appl. No.: 856,279

[22] Filed: Dec. 1, 1977

[51] Int. Cl.³ ............................................. H02B 1/20
[52] U.S. Cl. ................................. 362/341; 362/217; 362/223; 362/297; 362/347; 362/350
[58] Field of Search .............. 362/341, 345, 347, 346, 362/217, 223, 350, 297

[56] References Cited

U.S. PATENT DOCUMENTS

| | | | |
|---|---|---|---|
| 3,679,893 | 7/1972 | Shemitz | 362/345 |
| 4,006,355 | 2/1977 | Shemitz | 362/297 |
| 4,106,083 | 8/1978 | Wolff | 362/217 |

Primary Examiner—Benjamin R. Padgett
Assistant Examiner—J. L. Barr
Attorney, Agent, or Firm—Cynthia Berlow

[57] ABSTRACT

An elongated high intensity lamp which serves as a line-type of light source is placed at the focus of a generally shaped parabolic reflector which extends longitudinally with the light source. The reflector surface closest to the lamp is inwardly deformed toward the light source. The inwardly deformed section may itself be a concavely shaped parabolic or arcuate region; or inwardly angled flat sections; or a flat region extending squarely across the top of the reflector. The distortion of the parabolic reflector shape produces a more uniform intensity distribution across the area being illuminated by the lamp and the reflector. A plurality of parallel line-type sources are also disclosed.

8 Claims, 11 Drawing Figures

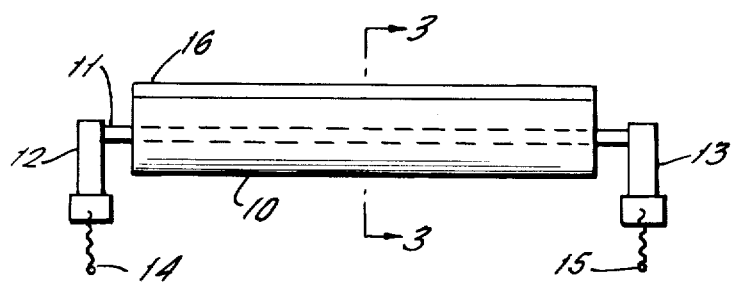
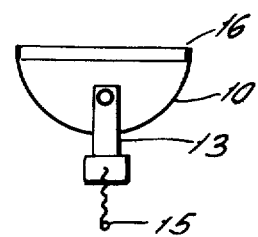
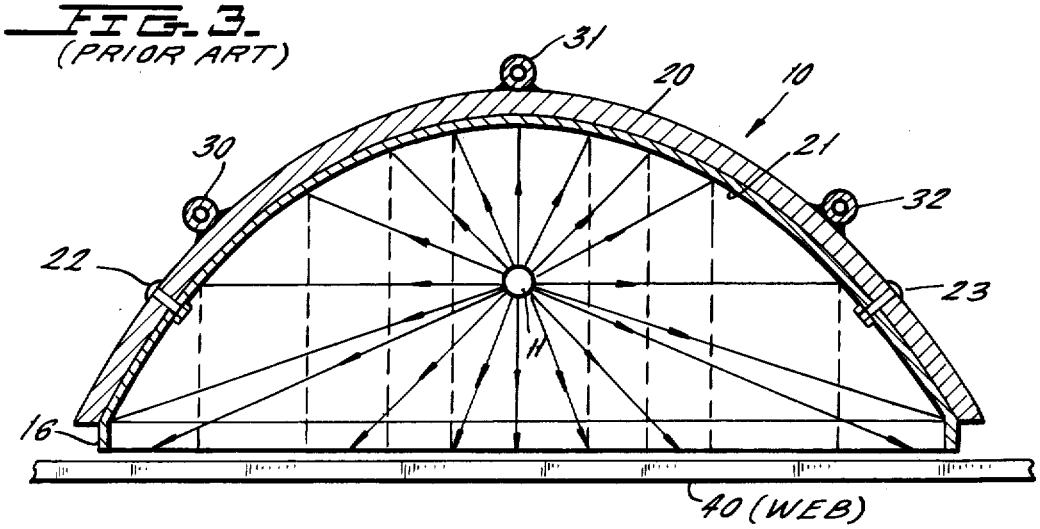
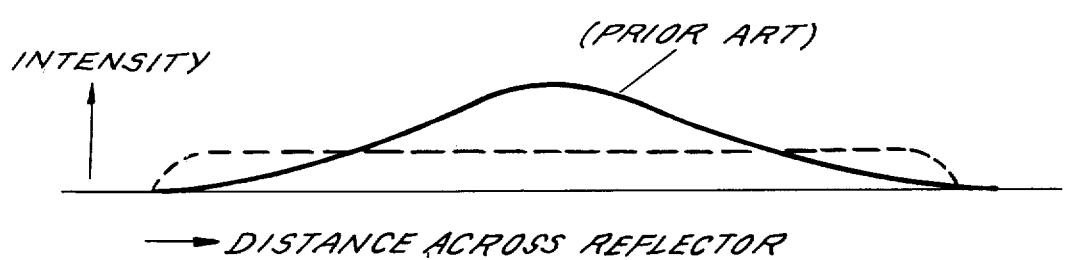

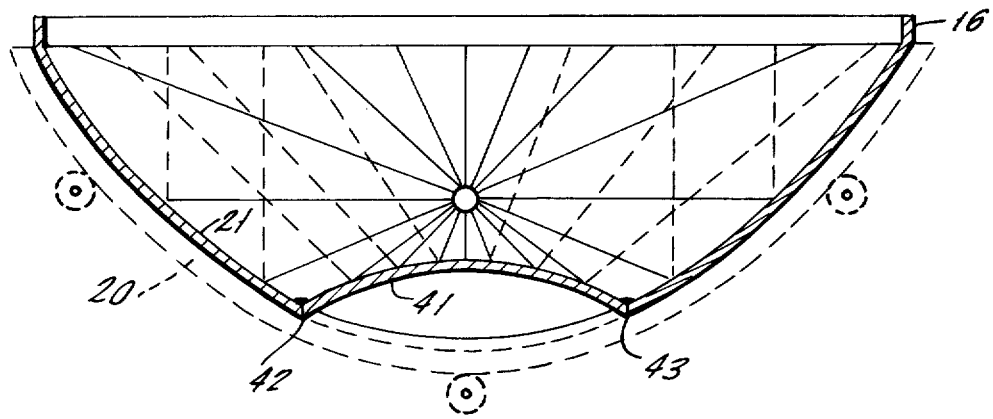
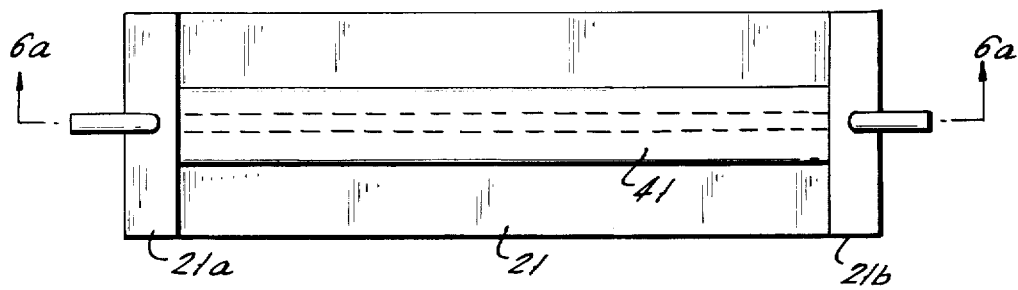
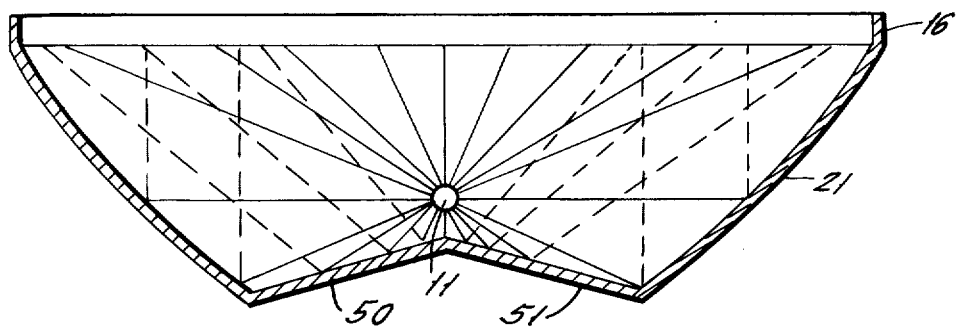
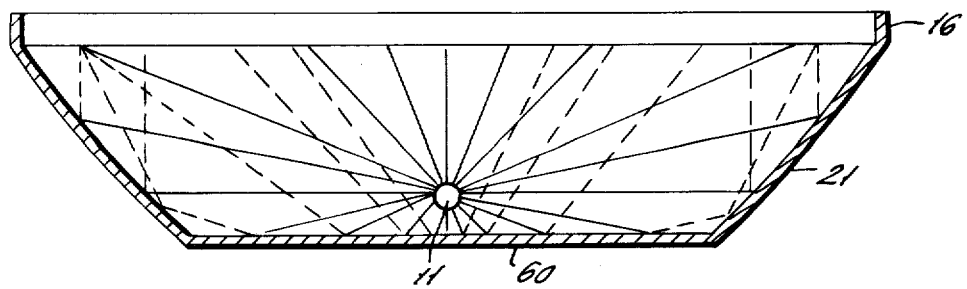

U.S. Patent Dec. 30, 1980 Sheet 3 of 3 4,242,725
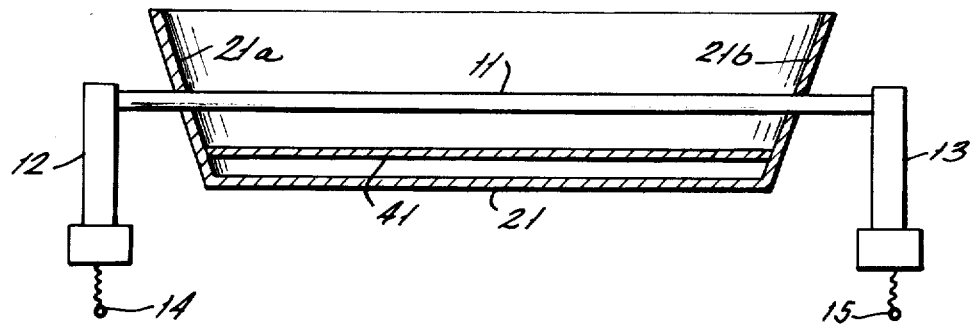
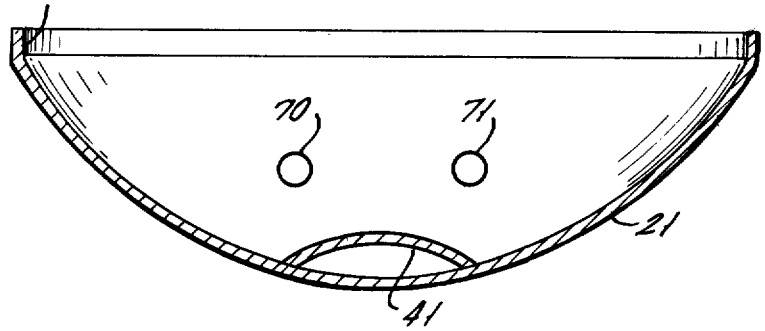
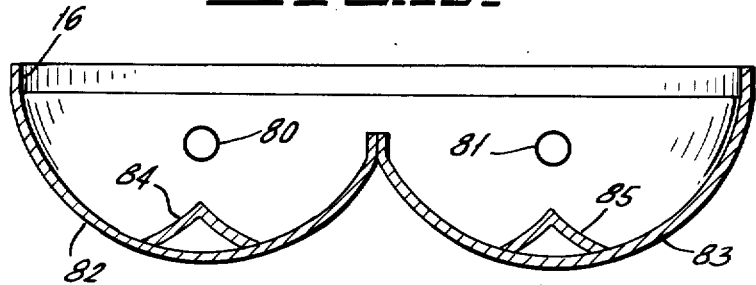

LIGHT REFLECTOR STRUCTURE

BACKGROUND OF THE INVENTION

This invention relates to light reflective structures, and more specifically relates to a novel reflective structure for an elongated high intensity lamp which produces a more uniform light distribution across the width of an elongated parabolic reflector having the elongated lamp at or adjacent to its focus.

Lamps which may be infrared, ultraviolet, or the like are known for exposure of light-sensitive materials. Parabolic reflectors are also well known for use in connection with such elongated line-type light sources used, for example, for the exposure of photographic plates. When the elongated light source is placed at the focal point of the parabolic shape, the configuration achieves only partial success in obtaining an even and uniform light distribution across the width of the parabolic reflector. The parabolic reflector will tend to reinforce or produce an increased light intensity on the surface of the area directly in line with or directly beneath the light source. Areas which are laterally removed from the center of the reflector and from the light source region receive less direct light and less reflected light. As a result, there is an uneven distribution of light across the width of the area being illuminated, with the light intensity being highest toward the lateral center of the area beneath the reflector.

In accordance with the present invention, a novel reflector shape is provided which produces an improved light distribution across the area being illuminated by an elongated parabolic reflector which contains an elongated line-type light source at or near its focus. The more uniform light intensity applied to the material to be exposed may then allow use of lower intensity light sources or faster cycle times, or generally more accurate illumination of any flat area.

In carrying out the present invention, the light reflector is modified by having the central lateral region thereof inwardly deformed toward the line source. This will then cause the light previously reflected toward the center of the area being illuminated to be reflected generally away from the center, thereby to more uniformly distribute light across the lateral width of the reflector.

In deforming the parabola, the deformed region can take the form of a concave or inwardly bent surface; or can take the form of angularly inwardly bent sections which are each flat; or could take the form of a single flat section extending across the top of the reflector. In each case, the center of the reflector is deformed toward the light source and away from its normal parabolic configuration. The use of flat members in the deformed region is useful since they simplify the construction of the reflector by permitting the use of elongated flat reflector sheets.

BRIEF DESCRIPTION OF THE DRAWINGS

FIG. 1 is an elevation view of a prior art type of parabolic reflector structure.

FIG. 2 is an end view of FIG. 1.

FIG. 3 is an enlarged cross-sectional view of FIG. 1 taken across the section line 3—3 in FIG. 1.

FIG. 4 is a plot of the intensity distribution across the width of the parabolic reflector of FIG. 3.

FIG. 5 is a cross-sectional view through a reflector constructed in accordance with the first embodiment of the present invention.

FIG. 6 is a plan view of the reflector of FIG. 5.

FIG. 6a is a cross-sectional view of FIG. 6 taken across section line 6a—6a in FIG. 6.

FIG. 7 is a cross-sectional view similar to that of FIGS. 3 and 5 of a second embodiment of the present invention.

FIG. 8 is a cross-sectional view through a reflector structure constructed in accordance with a third embodiment of the present invention.

FIG. 9 is a cross-sectional view through a reflector structure which uses the present invention, and which has two line-type sources.

FIG. 10 is similar to FIG. 9 but shows a modified arrangement for the reflector.

DETAILED DESCRIPTION OF THE DRAWINGS

Referring first to FIGS. 1 and 2, there is schematically illustrated a typical prior art-type parabolic reflector structure 10 which has a lamp 11 disposed in the focus thereof where the reflector 10 and the lamp 11 are both elongated members. Lamp 11 may be any type of elongated lamp source, such as an ultraviolet lamp, infrared lamp, or the like which could be useful for purpose of curing photopolymerizable materials or for exposing photographic negatives or the like.

As seen in FIGS. 1 and 2, lamp 11 has suitable end terminal supports 12 and 13 which are electrically connected to electrical terminals 14 and 15, respectively, which are connected to a suitable voltage source for operating lamp 11. Note that the parabolic reflector 10 may have an extending shroud 16 which is a short, cylindrical member extending from its open end.

FIG. 3 shows the configuration of the prior art reflector 10 in more detail, where the reflector 10 is composed of a rigid metallic housing 20 which contains a thin metallic reflector sheet 21, which may be of relatively thin stock, typically 0.005 to 0.150 inches thick. If lamp 11 is an ultraviolet lamp, reflector 21 is preferably constructed of lightweight metal that retains reflective properties by resisting oxidation even in an oxidizing atmosphere accompanied by heat and ultraviolet radiation. Suitable materials are sold under the trademarks LURIUM and ALZAK. Reflectors of this structure are shown in U.S. Pat. No. 3,747,307 in the name of Peek and Newman and in U.S. Pat. No. 3,826,014 in the name of Helding, both of which are assigned to the assignee of the present invention.

Reflector 21 is mounted to the support 20 by a plurality of screws, such as screws 22 and 23 which are contained in slotted regions of reflector 21 to enable the reflector to expand and contract as its temperature changes. The support housing 20 may be water-cooled as by having water-carrying conduits 30, 31 and 32 connected thereto.

The housing then has an elongated lamp 11 which serves as a line source and could have any desired length, for example, 24 inches, with the reflector having an opening or lateral width, for example, of 24 inches.

FIG. 3 also shows the placement of a flat plate 40 adjacent the open end of the reflector 10 and particularly adjacent the shroud 16. Plate 40 can be of any desired nature depending on the use of the lamp assembly of FIG. 3. Thus plate 40 could be a photographic plate covered by a negative where the plate is to be exposed through the negative. Flat plate 40 could be replaced by a web of photopolymerizable material which is to be polymerized by the action of an ultraviolet lamp; or can be a moving web which moves either axially along or laterally across the lamp assembly.

FIG. 3 shows light rays emanating from the line source 11 in solid lines, where the light rays are spaced by given equal angles. Light reflected by reflector 10 in FIG. 1 is shown in dotted lines. The reflected rays are more widely spaced at the lateral edges of the reflector than at the central region of the reflector. Consequently, and as shown in solid lines in FIG. 4, the light intensity distribution across the lateral width of the reflector 10 (perpendicular to the reflector focus) is high in the center and low at the lateral edges. This non-uniform distribution is disadvantageous in the exposure of photographic plates or in any other situation where a uniform light distribution over a large area is desired.

In accordance with the present invention, the structure of the reflector 10 is modified such that the reflector regions closest to the lamp 11 are distorted inwardly and toward the lamp, thereby to modify the intensity distribution across the reflector to that shown in the dotted line in FIG. 4.

In a first embodiment of the invention, as shown in FIGS. 5, 6 and 6a, the interior reflector shell 21 has a generally parabolic shape but the central region thereof is inwardly dished as shown at inwardly dished region 41. Reflector shell 21 preferably is a metallic shell having a hammered surface. Note that the parabolic section 21 still permits the assembly to be supported within the conventional parabolic support casing 20. Outwardly flared, flat end plates 21a and 21b which are also hammered-surface reflectors are provided at the opposite ends of reflector 21 and are received in any desired manner.

In order to manufacture the reflector structure of FIG. 5, it is possible to use a conventional reflector liner 21 and simply cut the reflector 21 laterally along the lines 42 and 43 and suitably mechanically connect a separate elongated parabolic section 41 in place as shown. Any desired method can be provided to fasten the section 41 to the reflector 21 as desired. Note that the surface of section 41 facing the lamp 11 will be a reflecting surface. It is not necessary to cut the conventional reflector 21 but the section 41 can simply be suitably fixed in place with respect to a single continuous parabolic reflector 21 if desired.

The provision of the inward or concave surface 41 with respect to light source 11 will modify the reflected rays from lamp 11 as shown in FIG. 5 and redistribute the higher intensity light which normally would be reflected into the center of the web into the outer lateral region of the web. Thus, the desired uniform intensity distribution generally shown in FIG. 4 can be obtained.

FIG. 7 shows a second embodiment of the invention wherein, in place of the concave section 41 which is distorted toward source 11, two flat elongated sections 50 and 51, having hammered surfaces forming an inverted V, are used in the center of the reflector 21. These will redistribute the reflected light from the reflector in the desired manner to produce a more uniform intensity distribution across the width of the parabolic reflector 21. Note that, again, the flat sections 50 and 51 may be simply connected in place on a continuous parabolic reflector 21. They can, however, be sections of a multiple-piece reflector which is connected together in the manner shown in FIG. 7 where the flat members 50 and 51 decrease the expense of producing the reflector.

FIG. 8 shows a further embodiment of the invention where the central region of the parabolic reflector is replaced by a single, flat reflector sheet 60 which is secured in position as shown. Again, sheet 60 may have a hammered surface. It should be further noted with respect to FIG. 8 that the remaining portion of the parabolic reflector 21 can be eliminated and replaced by generally straight sides which taper inwardly toward the flat member 60. Thus, the entire reflector structure is constructed of, essentially, three flat reflector sheets and, of course, the manufacture of the reflector will be simplified. Moreover, the structure will produce a generally good uniform intensity distribution across the width of the reflector.

In each of FIGS. 6, 7 and 8, the parabolic reflector 21 has been modified such that the central elongated region of the reflector is uniformly distorted inwardly toward the line source 18. In each case, and as shown by the light rays drawn in the figures, the reflected light rays are more uniformly distributed than those of the prior art parabolic reflectors shown in FIG. 3.

FIGS. 9 and 10 show embodiments of the invention wherein two elongated parallel lamps 70 and 71 are used instead of the single lamp 11 of the preceding figures.

In FIG. 9, the parabolic reflector 21 and its insert 41 of FIG. 5 are used, but the lamps 70 and 71 are off set from the focal point of the parabola, and are disposed to be just above about the edge of insert 41, and are at the level of the focal line of the parabolic shape of reflector 21. In this arrangement of FIG. 9, increased intensity is obtained, as compared to an embodiment using a single lamp.

FIG. 10 shows an arrangement for obtaining increased lamp intensity by using two parallel lamps 80 and 81 where, however, respective parabolic reflectors 82 and 83 are provided for the lamps 80 and 81. Reflectors 82 and 83 may be each constructed of a hammered reflector material, and each may have inserts 84 and 85 which are reflector sections deformed toward their respective lamp, as described in connection with FIGS. 5 and 7. Note, however, that the width of reflectors 82 and 83 will be one-half that of reflector 21 of FIG. 5 and that the height of reflectors 82 and 83 will be less than that of reflector 21. Note further that three or more parabolic sections could be used, instead of the two shown in FIG. 10. Reflectors 82, 83, 84 and 85 may be secured together in any desired manner.

Although preferred embodiments of this invention have been described, many variations and modifications will now be apparent to those skilled in the art, and it is preferred therefore that the instant invention be limited not by the specific disclosure herein but only by the appended claims.

We claim:

1. A reflector for producing a uniform distribution of radiation over a given area comprising: a lamp elongated along a straight line and a modified parabolic reflector extending substantially coextensively with said lamp; said lamp being supported generally parallel to and within a relatively short distance of the focal line of said reflector; said reflector defining a parabolic surface except in the central surface region of said reflector, and said central surface region of said reflector being uniformly and symmetrically distorted inwardly toward said lamp and away from said parabolic surface defined by the undistorted regions of said reflector, for modifying the intensity distribution of radiation reflected by said reflector from one having increased intensity toward the laterally central regions of said reflector to one having a more even lateral intensity distribution.

2. The reflector of claim 1 wherein said central surface region of said reflector consists of a curved, generally cylindrical section which curves inwardly toward said lamp.

3. The reflector of claim 2 wherein said reflector contains a continuous parabolic shaped portion, and wherein said curved cylindrical section is fixed to the interior surface of said continuous parabolic shaped portion.

4. The reflector of claim 1 wherein said reflector contains a continuously parabolic shape, and wherein said central surface region of said reflector is fixed to said continuous parabolic shaped section.

5. The reflector of claim 1 wherein said central surface region of said reflector consists of first and second flat panels defining an inverted V shape having its apex directed toward said lamp.

6. The reflector of claim 1 wherein said central surface region of said reflector consists of a single flat panel extending lateraly across said reflector and disposed in a plane parallel to the plane containing the open end of said reflector.

7. The reflector of claim 1 wherein said lamp is an elongated ultraviolet radiation source.

8. The reflector of claim 1 wherein said reflector includes a metallic, water-cooled support housing.

* * * * *